United States Patent
Wills et al.

(10) Patent No.: US 10,213,866 B2
(45) Date of Patent: *Feb. 26, 2019

(54) DUAL-SPECTRUM DIGITAL IMAGING WELDING HELMET

(71) Applicant: Lincoln Global, Inc., City of Industry, CA (US)

(72) Inventors: Douglas Alan Wills, Sagamore Hills, OH (US); William T. Matthews, Chesterland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 534 days.

This patent is subject to a terminal disclaimer.

(21) Appl. No.: 14/732,969

(22) Filed: Jun. 8, 2015

(65) Prior Publication Data

US 2015/0266128 A1    Sep. 24, 2015

Related U.S. Application Data

(63) Continuation of application No. 13/108,168, filed on May 16, 2011, now Pat. No. 9,073,138.

(51) Int. Cl.
*B23K 9/32* (2006.01)
*B23K 9/095* (2006.01)
(Continued)

(52) U.S. Cl.
CPC .............. *B23K 9/322* (2013.01); *A42B 3/042* (2013.01); *A42B 3/0433* (2013.01); *A42B 3/225* (2013.01);
(Continued)

(58) Field of Classification Search
CPC ............. B23K 9/10; B23K 9/095; B23K 9/32
(Continued)

(56) References Cited

U.S. PATENT DOCUMENTS 4,155,122 A * 5/1979 Budmiger ............... A61F 9/065
                                                              2/8.7
5,519,522 A    5/1996 Fergason
(Continued)

FOREIGN PATENT DOCUMENTS

FR    2742287 A1    6/1997
WO    0158400 A1    8/2001
(Continued)

OTHER PUBLICATIONS

PCT/IB2012/00945 International Search Report and Written Opinion, dated Sep. 6, 2012.

*Primary Examiner* — Dana Ross
*Assistant Examiner* — Ayub Maye
(74) *Attorney, Agent, or Firm* — Brad C. Spencer

(57) ABSTRACT

Arc welding systems, methods, and apparatus that provide dual-spectrum, real-time viewable, enhanced user-discrimination between arc welding characteristics during an arc welding process. Welding headgear is configured to shield a user from harmful radiation and to include a digital camera or cameras to provide dual-spectrum (i.e., both visible spectrum and infrared spectrum) real-time digital video image frames. The welding headgear is also configured with an optical display assembly for displaying real-time digital video image frames to the user while wearing the headgear during an arc welding process. Image processing is performed on the visible and infrared spectrum video image frames to generate dual-spectrum video image frames providing an integrated and optimized view of both the visible and thermal characteristics of the arc welding process which can be viewed by the user on the optical display assembly in real time.

17 Claims, 7 Drawing Sheets

(51) Int. Cl.
  *A42B 3/04* (2006.01)
  *A42B 3/22* (2006.01)
  *H04N 5/265* (2006.01)
  *H04N 5/33* (2006.01)
  *H04N 7/18* (2006.01)

(52) U.S. Cl.
  CPC ........... *B23K 9/0956* (2013.01); *H04N 5/265* (2013.01); *H04N 5/33* (2013.01); *H04N 7/183* (2013.01)

(58) Field of Classification Search
  USPC ............... 219/130.01, 147, 136; 2/7, 8.2
  See application file for complete search history.

(56) References Cited

U.S. PATENT DOCUMENTS

| | | | |
|---|---|---|---|
| 6,067,129 A | 5/2000 | Fergason | |
| 6,230,327 B1 | 5/2001 | Briand | |
| 6,242,711 B1 | 6/2001 | Cooper | |
| 6,710,298 B2 | 3/2004 | Eriksson | |
| 7,161,135 B2 | 1/2007 | Fergason | |
| 7,342,210 B2 | 3/2008 | Fergason | |
| 7,501,613 B2 | 3/2009 | Fergason | |
| 7,550,698 B2 | 6/2009 | Fergason | |
| 7,926,118 B2 * | 4/2011 | Becker | A61F 9/067 2/8.2 |
| 8,316,462 B2 | 11/2012 | Becker et al. | |
| 8,569,655 B2 * | 10/2013 | Cole | A61F 9/06 2/8.2 |
| 2005/0017152 A1 | 1/2005 | Fergason | |
| 2007/0089215 A1 | 4/2007 | Biche et al. | |
| 2009/0231423 A1 | 9/2009 | Becker et al. | |
| 2009/0276930 A1 | 11/2009 | Becker et al. | |
| 2010/0088793 A1 | 4/2010 | Ghisleni et al. | |
| 2011/0085030 A1 | 4/2011 | Poe et al. | |

FOREIGN PATENT DOCUMENTS

| | | |
|---|---|---|
| WO | 2004001488 A1 | 12/2003 |
| WO | 2005102230 A1 | 11/2005 |
| WO | 2009114753 A2 | 9/2009 |

* cited by examiner

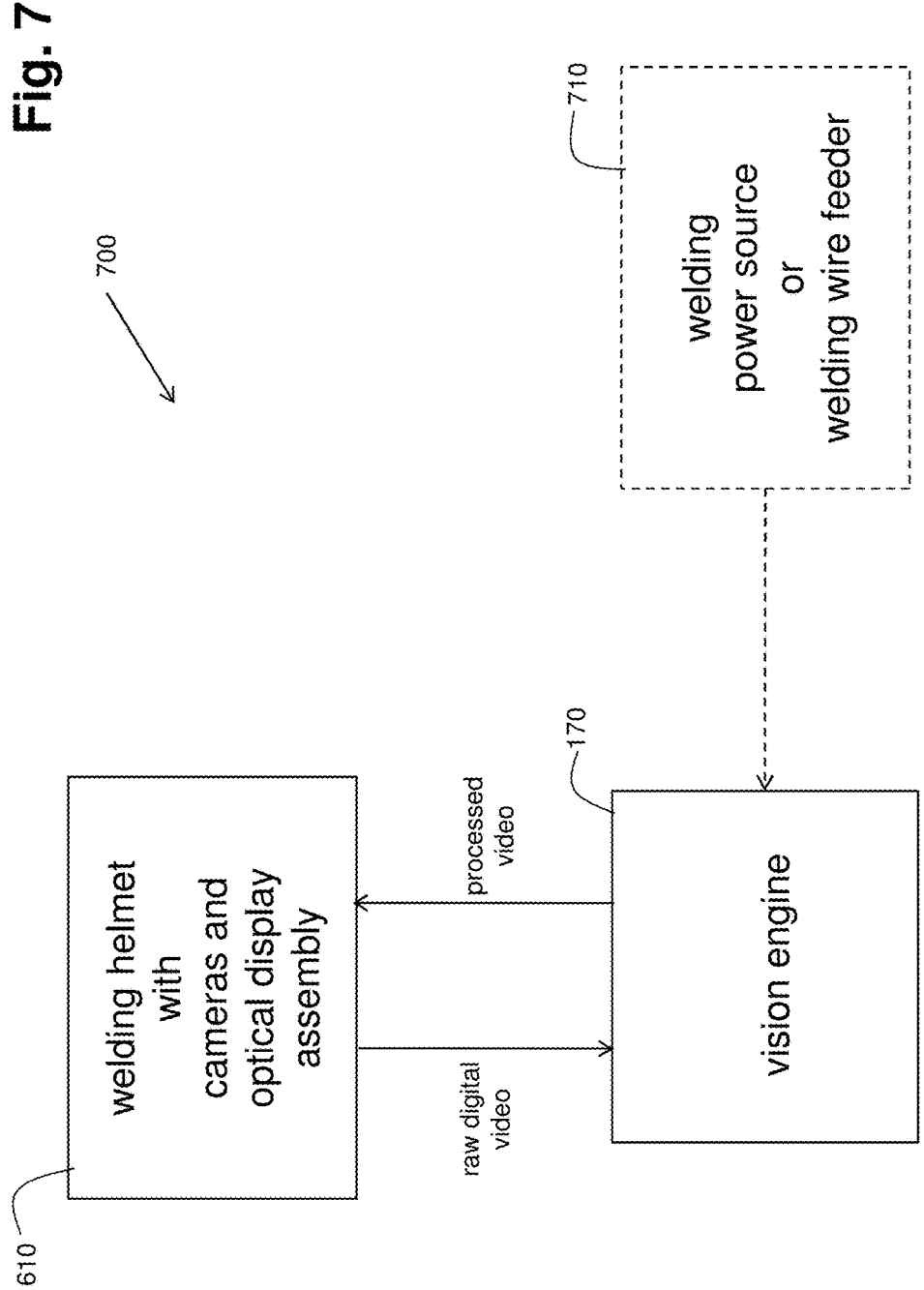

DUAL-SPECTRUM DIGITAL IMAGING WELDING HELMET

CROSS-REFERENCE TO RELATED APPLICATIONS AND INCORPORATION BY REFERENCE

This U.S. patent application is a continuation of and claims the benefit of U.S. non-provisional patent application Ser. No. 13/108,168 filed on May 16, 2011, which is incorporated herein by reference in its entirety.

TECHNICAL FIELD

Certain embodiments relate to the visualization of arc welding characteristics during an arc welding process. More particularly, certain embodiments relate to systems, methods, and apparatus (e.g., a welding helmet) providing dual-spectrum, real-time viewable, enhanced user-discrimination between arc welding characteristics during an arc welding process.

BACKGROUND

During an arc welding process, various forms of radiation are emitted including light in the visible, infrared, and ultraviolet spectrums. The emitted radiation may be of high intensity and can harm the eyes and/or skin of the user if the user is not properly protected. Traditionally, a user wears a conventional welding helmet having a window with one or more protective lenses to reduce the intensity of the radiation to safe levels. However, such protective lenses, while providing adequate protection for the user, reduce the amount of light through the lens and do not allow the user to see the visible characteristics of the arc welding process in an optimal manner. For example, certain visible characteristics of the arc and/or the molten metal puddle may be filtered out which the user would prefer to see, or smoke from the arc welding process may obscure the arc and/or the molten metal puddle during portions of the process. Furthermore, such protective lenses do not allow the user to see the thermal or infrared characteristics of the arc, the puddle, or the surrounding metal at all. Also, users that require corrective lenses are disadvantaged when using conventional helmet and are restricted to using a few "cheater" lenses that provide some magnification.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Arc welding systems, methods, and apparatus that provide dual-spectrum, real-time viewable, enhanced user-discrimination between arc welding characteristics during an arc welding process are disclosed herein. A welding headgear is configured to shield a user from harmful radiation and to include a digital camera or cameras to provide dual-spectrum (i.e., both visible spectrum and infrared spectrum) real-time digital video image frames. The welding headgear is also configured with an optical display assembly for displaying real-time digital video image frames to the user while wearing the headgear during an arc welding process. Image processing is performed on the visible and infrared spectrum video image frames to generate dual-spectrum video image frames providing an integrated and optimized view of both the visible and thermal characteristics of the arc welding process which can be viewed by the user on the optical display assembly. As a result, for a given welding process, a user is able to view desired visible and thermal characteristics of the arc welding process. Unwanted characteristics and obstructions are filtered out while wanted characteristics are preserved and enhanced, providing the user with maximum insight and awareness of the arc welding process in real-time. With such maximum insight and awareness, a user may more readily and effectively adapt his welding technique to form a quality weld. For example, a user may be able to more clearly view and understand the "freezing" or solidifying characteristics of a weld puddle and have better instantaneous knowledge of the weld, and thus be able to have more control resulting in a better weld.

These and other features of the claimed invention, as well as details of illustrated embodiments thereof, will be more fully understood from the following description and drawings.

BRIEF DESCRIPTION OF THE DRAWINGS

FIG. 7 is a schematic block diagram of a third example embodiment of a dual-spectrum digital imaging arc welding system providing enhanced user-discrimination between arc-welding characteristics.

DETAILED DESCRIPTION

Embodiments of the present invention are concerned with systems, methods, and apparatus providing dual-spectrum (e.g., visible-spectrum and infrared-spectrum), real-time viewable, enhanced visibility of arc welding characteristics during an arc welding process. In accordance with certain embodiments of the present invention, such capability is provided in a dual-spectrum welding helmet worn by the user performing the welding process.

As used herein, the term "physically integrated" refers to being positioned on, being an integral part of, or being attached to (with or without the capability to be subsequently unattached). As used herein, the term "real-time" refers to significantly maintaining the temporal characteristics of an imaged welding process scene with minimal or largely imperceptible delay between image capture and display.

Figure 1:
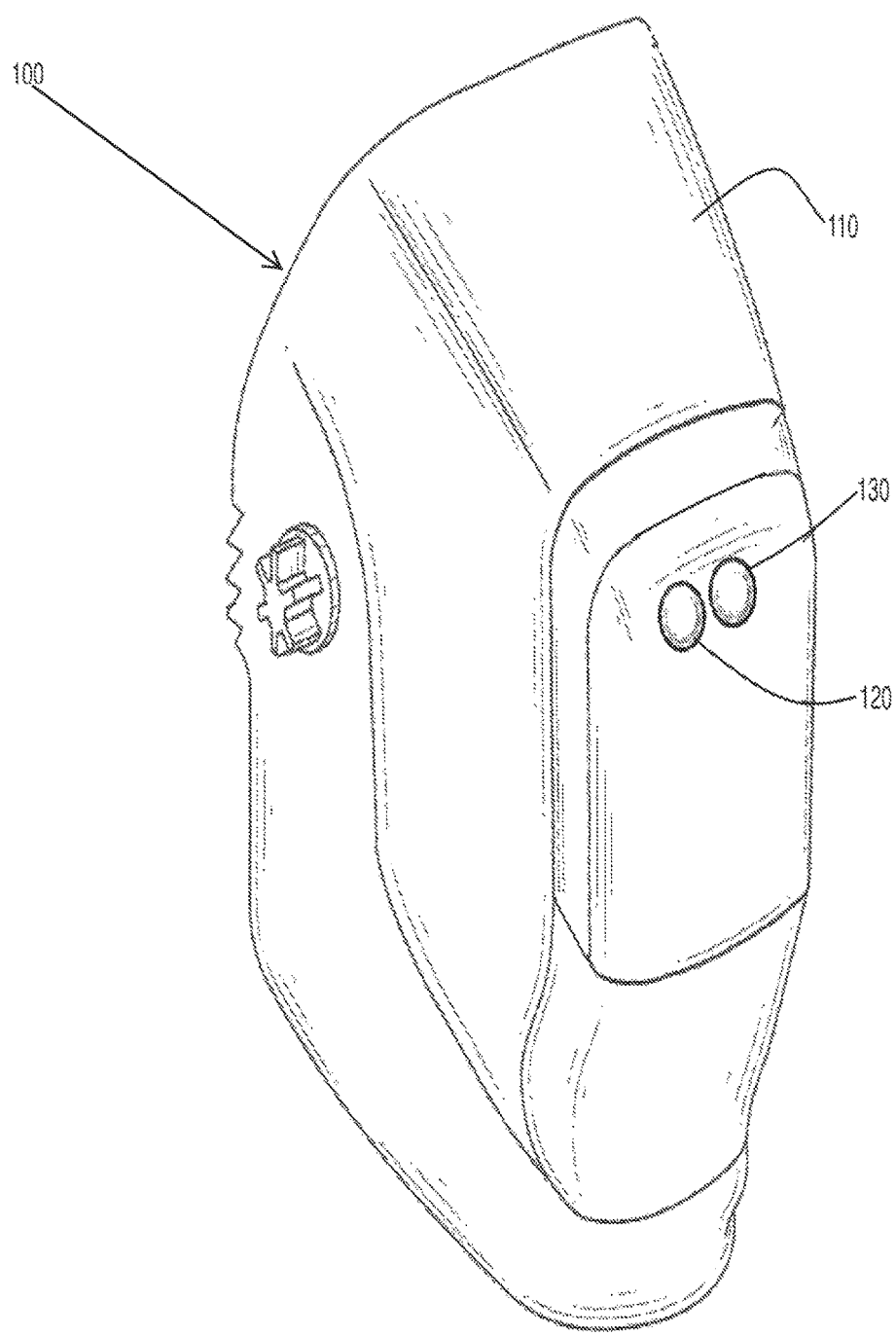
FIG. 1 is an illustration of a first example embodiment of a dual-spectrum digital imaging arc welding system for providing enhanced discrimination between arc welding characteristics.

Details of various embodiments of the present invention are described below herein with respect to FIGS. 1-7. FIG. 1 is an illustration of a first example embodiment of a dual-spectrum digital imaging arc welding system 100 for providing enhanced discrimination between arc welding characteristics to a user. The system 100 of FIG. 1 includes a welding helmet (welding headgear) or welding shield 110 that is worn by a welder during a welding process. The welding helmet 110 does not have a window with, for example, a glass filter lens as certain conventional welding helmets have. Instead, the system 100 includes a welding helmet 110 that has digital imaging technology integrated into the helmet 110 to capture and display desired aspects of the welding process scene to the welder. Both visible-spectrum (VS) and infrared-spectrum (IRS) energy from the welding process are sensed through a VS lens 120 and an IRS lens 130, respectively on the front of the helmet 110.

Figure 2:
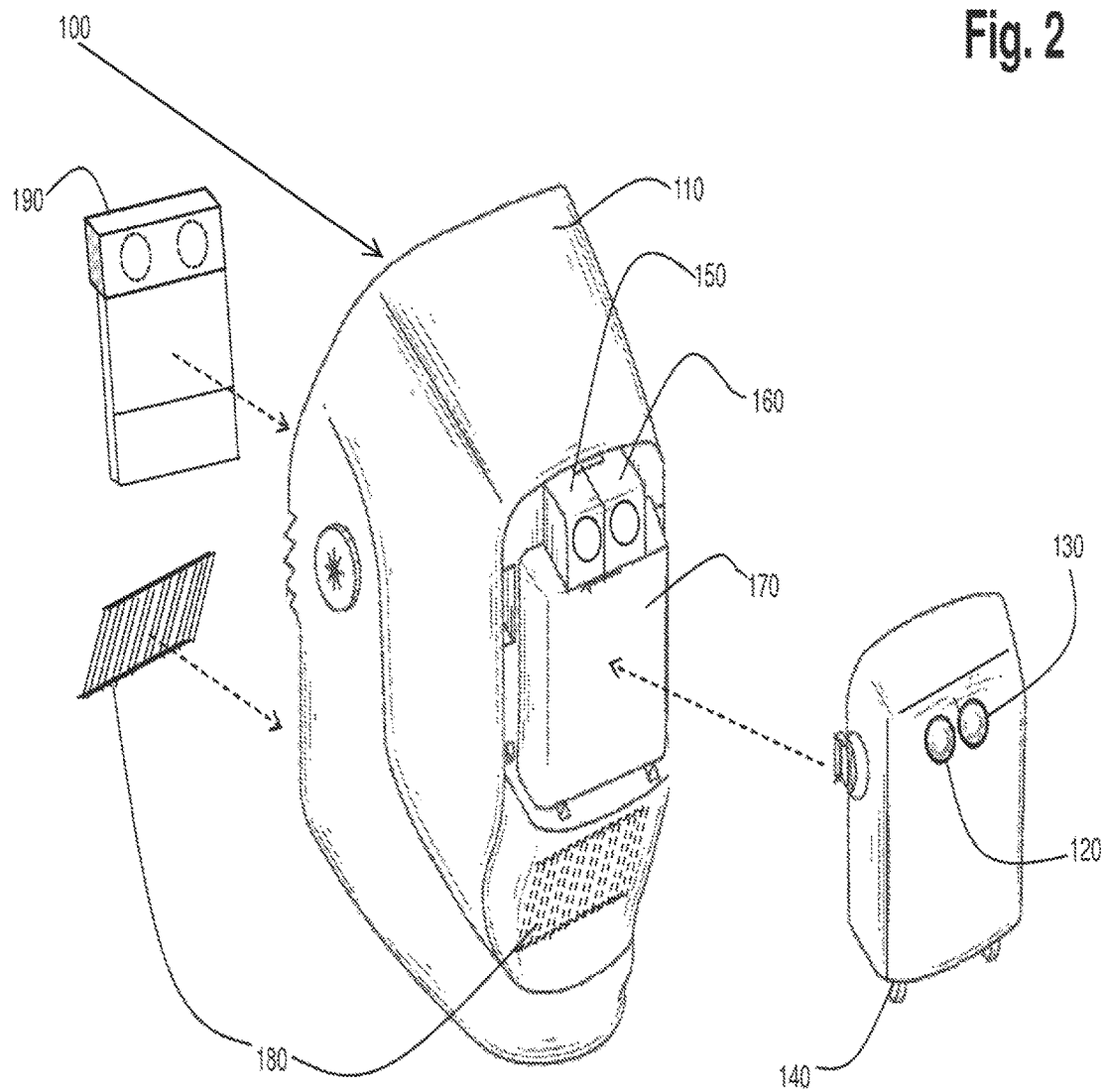
FIG. 2 is an illustration of an exploded view of the system of FIG. 1 showing various elements of the system.

FIG. 2 is an illustration of an exploded view of the system 100 of FIG. 1 showing various elements of the system 100, including various imaging elements that are physically integrated into the welding helmet 110. The system 100 includes a removable lens cover 140 having the VS lens 120 and the IRS lens 130. The lens cover 140 attaches to the helmet 110 at the front of the helmet 110. When removed, the lens cover 140 reveals a visual-spectrum (VS) digital camera 150, an infrared-spectrum (IRS) digital camera 160, and a vision engine 170. When the lens cover 140 is attached to the helmet 110, the lenses 120 and 130 operatively integrate with their respective cameras 150 and 160 which are used to simultaneously capture visible-spectrum light and infrared-spectrum light from a welding process scene, and generate raw visible-spectrum (VS) real-time digital video image frames and raw infrared-spectrum (IRS) real-time digital video image frames. In accordance with an embodiment of the present invention, the cameras 150 and 160 are high-definition, high speed video cameras capable of generating image frames in real-time. Furthermore, the cameras 150 and 160 may provide either grayscale or color pixel information, in accordance with various embodiments of the present invention.

The system 100 also includes a vision engine 170 that operatively interfaces with the cameras 150 and 160. The vision engine 170 receives the raw VS and IRS real-time digital video image frames from the cameras 150 and 160 and performs image processing on the digital video image frames to create dual-spectrum (DS) real-time digital video image frames which combine desired VS and IRS image attributes from the respective VS and IRS imaging frames. As described later herein in more detail, the vision engine 170 first generates pre-processed VS and IRS digital video image frames from the corresponding raw digital video image frames and then proceeds to generate the DS real-time digital video image frames from the pre-processed VS and IRS frames. In accordance with an embodiment of the present invention, the welder may choose to view the DS, pre-processed VS, or pre-processed IRS real-time digital video image frames during the welding process.

The system 100 further includes an optical display assembly comprising an LCD display 180 and a set of optics 190. The LCD display 180 operatively interfaces to the vision engine 170 to receive processed real-time digital video (e.g., DS real-time digital video image frames) from the vision engine 170. In accordance with an embodiment of the present invention, the LCD display 180 is a full-color high-resolution display capable of being updated in real-time. The optics 190 operatively interfaces to the LCD display 180 to project the processed real-time digital video to the eyes of the welder within the helmet 110. In accordance with an embodiment of the present invention, the optics 190 includes a configuration of high resolution reflective mirrors, optical lenses, and electronics that may be configured to focus the welding process scene such that the welding process scene appears at a correct distance from the welder. The optics 190 may provide other capabilities as well including, for example, a zoom feature. Such a feature may selectable via a user interface (see schematic element 310 of FIG. 3) operatively interfacing to the optical display assembly.

Figure 3:
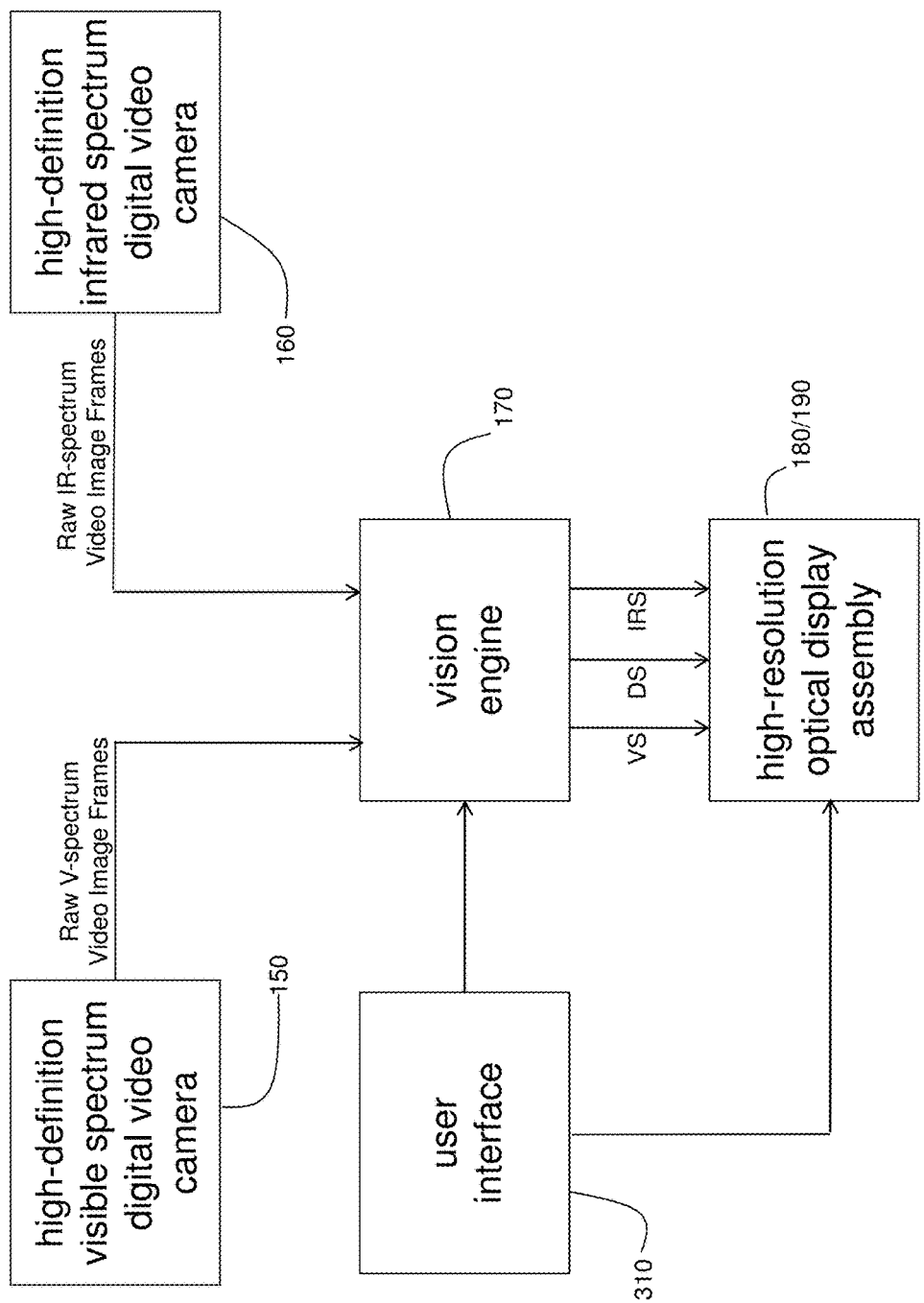
FIG. 3 is a schematic block diagram of the embodiment of the dual-spectrum digital imaging arc welding system of FIG. 1 and FIG. 2 showing various imaging elements.

FIG. 3 is a schematic block diagram of the embodiment of the dual-spectrum digital imaging arc welding system 100 of FIG. 1 and FIG. 2 showing various imaging elements. As illustrated in FIG. 3, the VS digital camera 150 provides raw VS video image frames to the vision engine 170. Similarly, the IRS digital camera 160 provides raw IRS video image frames to the vision engine 170. The term "raw" is used herein to mean that the video image frames have only been optically and electronically processed by the cameras 150 and 160 and not yet by the vision engine 170, and that the video image frames out of the cameras 150 and 160 are highly representative of all aspects of the welding process scene including both wanted and unwanted attributes of the scene. That is, the raw video image frames have not yet been processed by the vision engine 170 to enhance those attributes that the welder desires to view, and to remove those attributes that the welder does not desire to view (e.g., obstructions). However, the lenses 120 and 130 and/or the cameras 150 and 160 may provide some optical filtering to, for example, cut down on glare from the arc.

The vision engine 170, upon receiving the raw VS and IRS digital video image frames from the cameras 150 and 160, proceeds to process the raw image frames to produce dual-spectrum (DS) real-time digital video image frames (i.e., image frames that combine both visible-spectrum information and infrared-spectrum information from the original raw image frames) which largely maintain the desirable real-time characteristics of the welding process scene. The DS real-time digital video image frames are provided to the optical display assembly 180/190 for viewing by the welder.

In accordance with an embodiment of the present invention, the vision engine is configured to also generate enhanced visible-spectrum (VS) real-time digital video image frames and enhanced infrared-spectrum (IRS) real-time digital video image frames. As a result, a welder (user) may be able to select, via the user interface 310, which of the three types of video (DS, enhanced VS, enhanced IRS) to display on the optical display assembly. Furthermore, in accordance with an embodiment of the present invention, the system 100 is configured to allow a user to select an imaging mode from a plurality of selectable and pre-defined imaging modes via the user interface 310. In accordance with various embodiments of the present invention, the user interface 310 may be integrated into the welding helmet 110 (e.g., as push-buttons on the side of the helmet), or may be a physically separate apparatus that interfaces in a wired or wireless manner with the helmet.

An imaging mode corresponds to a pre-defined configuration of image processing to be performed by the vision engine. For example, one imaging mode may be defined to display infrared-spectrum information associated with the molten welding puddle and visible-spectrum information associated with the arc. Similarly, another imaging mode may be defined to display visible-spectrum information associated with the molten welding puddle and infrared-spectrum information associated with the arc. Still, another imaging mode may be defined to display blended visible-spectrum and infrared-spectrum information associated with the molten metal puddle, infrared-spectrum information associated with the metal workpiece away from the molten metal puddle, and visible-spectrum information associated with the electrode wire and the arc. Many other imaging modes are possible as well.

In accordance with an embodiment of the present invention, the system 100 is configured to allow a user to change an imaging parameter preset to one of a plurality of selectable and pre-defined imaging parameter presets. An imaging parameter preset corresponds to a pre-defined setting of an imaging parameter. For example, one imaging parameter preset may be a color map. The system 100 may provide a plurality of color maps that a user may select when viewing, for example, infrared-spectrum information. Another imaging parameter preset may be a level of spatial filtering or smoothing. The system 100 may provide a plurality of levels of spatial filtering that a user may select when viewing, for example dual-spectrum information. Still, another imaging parameter preset may be a level of temporal filtering or smoothing. The system 100 may provide a plurality of levels of temporal filtering that a user may select in order to, for example, filter out obstructing smoke from the displayed video.

Figure 4:
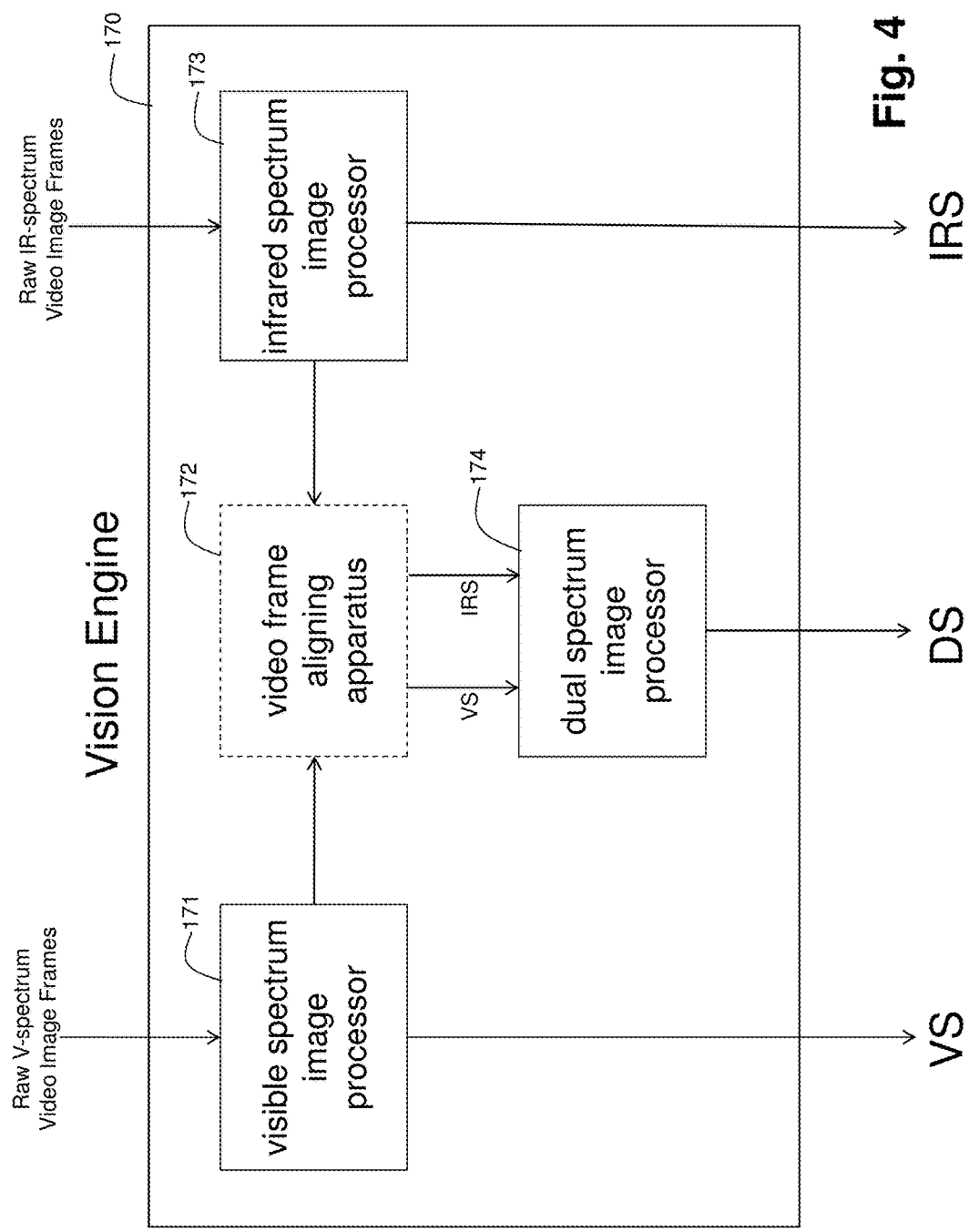
FIG. 4 is a schematic block diagram of an example embodiment of a vision engine used in the system of FIGS. 1-3.

FIG. 4 is a schematic block diagram of an example embodiment of a vision engine 170 used in the system 100 of FIGS. 1-3. The vision engine 170 takes the raw VS video image frames, from the VS video camera 150, into a first visible-spectrum (VS) image processor 171. The VS image processor 171 operates on the raw VS video image frames to generate processed (or pre-processed) VS video image frames. The raw VS video image frames are processed by the VS image processor 171 to enhance the usable visible-spectrum information (e.g., certain visible characteristics of the welding arc) in the video frames and to remove unwanted information (e.g., smoke). The various image processing functions that may be performed by the VS image processor 171 include, for example, spatial filtering, thresholding, temporal filtering, spectral filtering, contrast enhancement, edge enhancement, and color mapping. Other types of image processing functions are possible as well, in accordance with various embodiments of the present invention.

Similarly, the vision engine 170 takes the raw IRS video image frames, from the IRS video camera 160, into a second infrared-spectrum (IRS) image processor 173. The IRS image processor 173 operates on the raw IRS video image frames to generate processed (or pre-processed) IRS video image frames. The raw IRS video image frames are processed by the IRS image processor 173 to enhance the usable infrared-spectrum information in the video frames (e.g., certain thermal characteristics of the molten metal puddle) and to remove unwanted information (e.g., background temperature of a workpiece). Similarly, the various image processing functions that may be performed by the IRS image processor 173 include, for example, spatial filtering, thresholding, temporal filtering, spectral filtering, contrast enhancement, edge enhancement, and color mapping. Other types of image processing functions are possible as well, in accordance with various embodiments of the present invention. The image processors may include buffers and memory for passing image frames in and out, and for temporarily storing processed image frames at various intermediate steps, for example.

The resultant enhanced VS and IRS real-time digital video image frames may be output to the optical display assembly 180/190 for display to the user (e.g., upon user selection of one or the other) and/or provided to a third dual-spectrum (DS) image processor 174 to generate combined dual-spectrum (DS) real-time digital image video frames. In accordance with an embodiment of the present invention, the video frames coming into the vision engine 170 from the cameras 150 and 160 are assumed to be temporally aligned or correlated. That is, both cameras 150 and 160 operate at a same acquisition frame rate and, therefore, any image frame coming into the VS image processor 171 at a particular time is assumed to correspond in time to an image frame coming into the IRS image processor 173 at that same particular time. However, in accordance with certain other embodiments, the VS image processor 171 and/or the IRS image processor 173 may be "tuned", "tweaked", or calibrated to temporally align the video frames of one to the other. Alternatively, a separate video frame temporal aligning apparatus may be provided in the vision engine to temporally align the VS and IRS image frames.

Furthermore, as can be seen from FIG. 1, the lenses 120 and 130 are spatially offset from each other on the lens cover 140. This may result in a certain amount of spatial misalignment between the pixels of a VS image frame and the pixels of an IRS image frame that are otherwise temporally correlated or aligned. In accordance with an embodiment of the present invention, the lenses 120 and 130 are positioned and calibrated to make sure that raw VS image frames are spatially aligned with the raw IRS video image frames. Such calibration techniques are well known in the art.

However, as an option, the temporally aligned VS and IRS video frames out of the respective image processors 171 and 173 may be spatially aligned by an optional video frame aligning apparatus 172. The video frame aligning apparatus 172 uses a spatial aligning algorithm to spatially line up or match the pixels of a VS frame to an IRS frame before providing the frames to the DS image processor 174. Such a spatial aligning algorithm may be anything from a sophisticated algorithm that implements state-of-the-art aligning techniques to a simple offset routine that simply applies a known, calibrated offset to the image frames in one or more spatial directions. Such aligning techniques are well-known in the art.

Once the enhanced (i.e., processed) VS and IRS video frames are provided to the DS image processor 174, the DS image processor 174 proceeds to process temporally correlated pairs of VS and IRS image frames to produce DS image frames, containing both visual-spectrum and infrared spectrum information in each video frame. The DS image processor 174 performs image processing on the pairs of image frames on a pixel-by-pixel basis to decide if a given DS pixel derived from a given pair of image frames should contain VS information, IRS information, or some blended combination of the two.

Various image processing decision making algorithms may be applied to make the VS/IRS pixel decision. For example, one image processing algorithm may be configured to assign IRS information to those pixels having IRS data falling within a defined thermal range, and assigning VS information to all other pixels falling outside of that thermal range. This may be the case when it is known that the thermal characteristics of the molten metal puddle of the selected welding process are very different from the thermal characteristics of the arc. As a result, the thermal characteristics of the puddle can be discriminated from the thermal characteristics of the arc. The thermal characteristics of the puddle may be displayed to the user while displaying enhanced visual characteristics of the arc, or vice-versa.

Furthermore, just as for the image processors 171 and 173, the various image processing functions that may be performed by the DS image processor 174 may include, for example, spatial filtering, thresholding, temporal filtering, spectral filtering, contrast enhancement, edge enhancement, and color mapping. Other types of image processing functions are possible as well, in accordance with various embodiments of the present invention.

Even if the raw image data from the cameras is in the form of grayscale data, the resultant DS images (and enhanced VS and IRS images) can be color coded by applying color maps to the pixel data. The various image processors 171, 173, and 174 may be, for example, digital signal processors (DSPs) or programmable processors running image processing software, in accordance with various embodiments of the present invention. Other types of processors may be possible as well, in accordance with other embodiments of the present invention. The image processing is done in real time so as to largely maintain the real-time or temporal characteristics of the imaged welding process scene.

Figure 5:
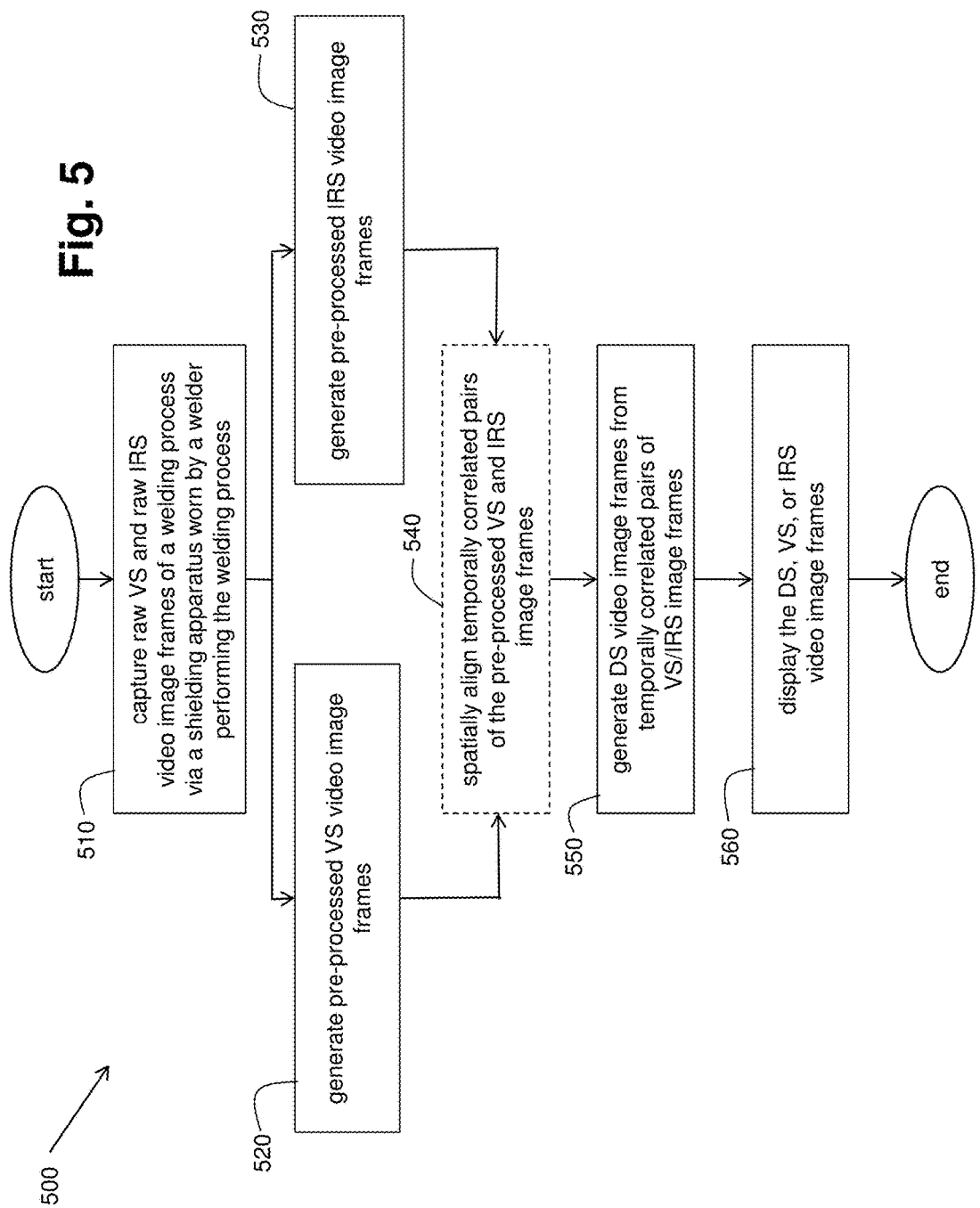
FIG. 5 is a flowchart of an embodiment of a method of generating enhanced dual-spectrum real-time digital video of a welding process using the system of FIGS. 1-4.

FIG. 5 is a flowchart of an embodiment of a method 500 of generating enhanced dual-spectrum real-time digital video of a welding process using the system 100 of FIGS. 1-4. In step 510 of the method 500, raw VS and raw IRS real time digital video image frames of a welding process are captured via a shielding apparatus worn by a welder performing the welding process to shield the welder from harmful radiation (e.g., bright visible light, heat, ultraviolet light) emitted by the welding process. In step 520, the raw VS real-time digital video image frames are pre-processed to generate pre-processed VS real-time digital video image frames by maintaining and enhancing desired visual-spectrum attributes of the welding process and by removing unwanted visual-spectrum attributes of the welding process.

In step 530, the raw IRS real-time digital video image frames are pre-processed to generate pre-processed IRS real-time digital video image frames by maintaining and enhancing desired infrared-spectrum attributes of the welding process and by removing unwanted infrared-spectrum attributes of the welding process. In step 540 (an optional step), temporally correlated pairs of VS and IRS pre-processed image frames are spatially aligned. In step 550, the temporally correlated pairs of image frames of the pre-processed VS and IRS image frames are further processed to generate dual-spectrum (DS) real-time digital video image frames. In step 560, one of the DS real-time digital video image frames, the pre-processed VS real-time digital video image frames, and the pre-processed IRS real-time digital video image frames is displayed to the welder via the shielding apparatus (e.g., via the optical display assembly 180/190 integrated into the helmet 110) as the welder wars the shielding apparatus during the welding process. Again, the user may select which video channel (VS, IRS, or DS) is to be displayed. Again, each pixel of each frame of the DS real-time digital video image frames corresponds to visual-spectrum information, infrared-spectrum information, or a blending of visual-spectrum information and infrared-spectrum information.

In accordance with an embodiment of the present invention, particular image processing functions performed as part of the pre-processing of the raw VS real-time digital video image frames are selectable from a plurality of image processing options. Similarly, particular image processing functions performed as part of the pre-processing of the raw IRS real-time digital video image frames are selectable from a plurality of image processing options. Furthermore, particular image processing functions performed as part of the processing to generate the DS real-time digital video image frames are selectable from a plurality of image processing options. Also, in accordance with an embodiment of the present invention, particular image processing functions performed as part of the pre-processing steps and the processing step of the method 500 are dependent on selection of a welding process from a plurality of welding processes.

Figure 6:
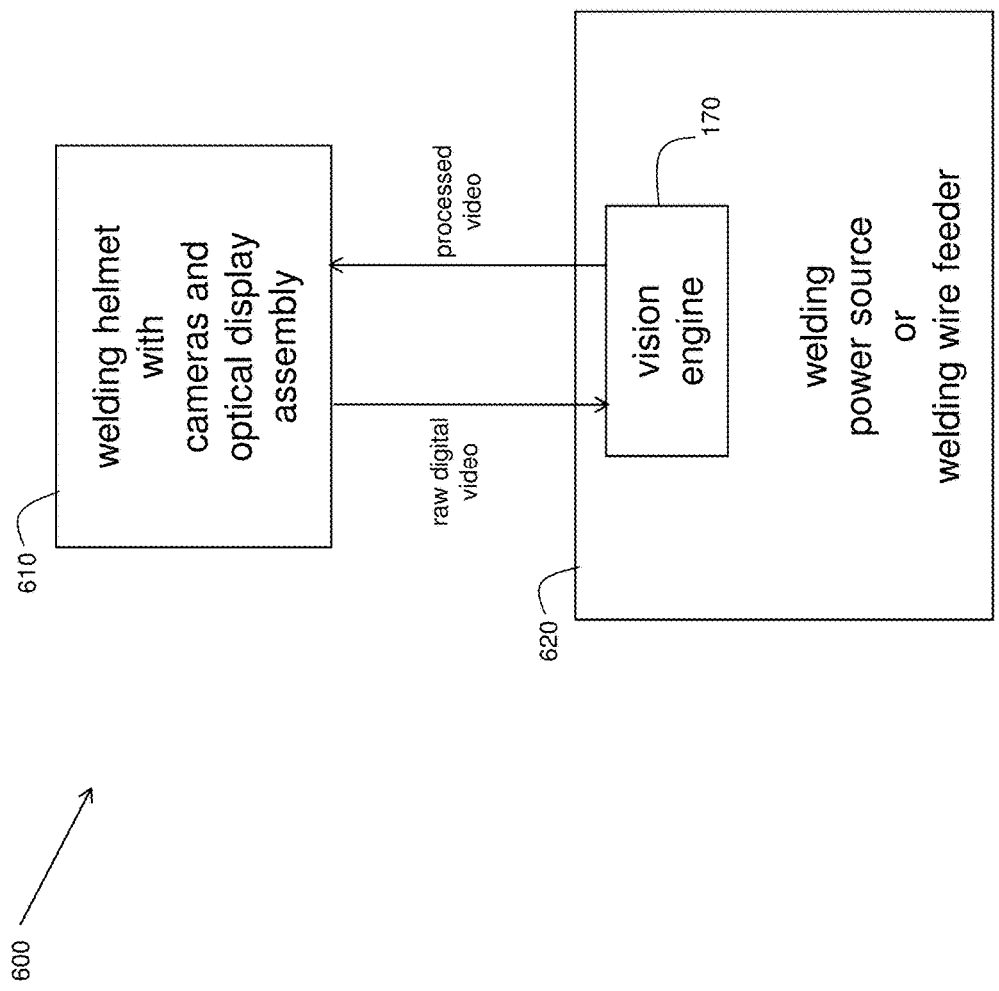
FIG. 6 is a schematic block diagram of a second example embodiment of a dual-spectrum digital imaging arc welding system providing enhanced user-discrimination between arc-welding characteristics.

FIG. 6 is a schematic block diagram of a second example embodiment of a dual-spectrum digital imaging arc welding system 600 providing enhanced user-discrimination between arc-welding characteristics for a user. The system 600 includes a welding helmet 610 having the lenses, cameras, and the optical display assembly of FIG. 2 physically integrated therewith. However, the system 600 also includes a welding power source and/or a welding wire feeder 620. In the embodiment of FIG. 6, the vision engine 170 is no longer physically integrated with the welding helmet but is, instead, integrated into the welding power source or the welding wire feeder. In such an embodiment, raw digital video (both VS and IRS) is sent from the cameras of the welding helmet to the vision engine 170 via wired or wireless means. Processed video (DS, VS, and IRS) is sent from the vision engine 170 back to the welding helmet via wired or wireless means. The configuration of FIG. 6 may be desirable if, for example, the vision engine 170 would take up too much space within the helmet, or if the vision engine would cause the helmet to weigh too much if integrated into the helmet. Alternatively, the vision engine could be mounted on the outside of the helmet such as, for example, on the top of the helmet to save space interiorly. The vision engine 170 may receive information from the welding power source and/or welding wire feeder 710 such as, for example, current selected welding mode, current electrode type, or current selected welding waveform and/or polarity. Such information may be used by the vision engine 170 to make image processing selections or decisions. Furthermore, a user interface may be integrated into the welding power source or the welding wire feeder to allow a user to select imaging modes, imaging parameter presets, etc.

FIG. 7 is a schematic block diagram of a third example embodiment of a dual-spectrum digital imaging arc welding system 700 providing enhanced user-discrimination between arc-welding characteristics for a user. The system 700 includes a welding helmet 610 having the lenses, cameras, and the optical display assembly of FIG. 2 physically integrated therewith. However, the vision engine 170 is physically separate from the helmet. In such an embodiment, raw digital video (both VS and IRS) is sent from the cameras of the welding helmet to the vision engine 170 via wired or wireless means. Processed video (DS, VS, and IRS) is sent from the vision engine 170 back to the welding helmet via wired or wireless means. The configuration of FIG. 7 may be desirable if, for example, the vision engine 170 would take up too much space within the helmet, or if the vision engine would cause the helmet to weight too much if integrated into the helmet. Again, alternatively, the vision engine could be mounted on the outside of the helmet such as, for example, on the top of the helmet to save space interiorly. As an option, the vision engine 170 may interface to a welding power source and/or welding wire feeder 710 (e.g., wired or wirelessly) to, again, receive information from the welding power source and/or welding wire feeder 710 such as, for example, current selected welding mode, current electrode type, or current welding waveform and/or polarity. Such information may be used by the vision engine 170 to make image processing selections or decisions. Furthermore, a user interface may be integrated into the vision engine to allow a user to select imaging modes, imaging parameter presets, etc.

In accordance with an enhanced embodiment of the present invention, non-imaging information may be generated, gathered, and displayed on the display 180. For example, various guide information or help attributes may be overlaid onto the displayed real-time video to aid the user during the welding process. Such non-imaging information may include, for example, gun/torch angle or stick electrode angle, stick out distance from the workpiece, travel speed of the gun/torch or stick electrode, and gun/torch height or stick electrode height. The non-imaging information may be obtained from another system such as, for example, a virtual reality welding simulation system which is tethered into the system 100 and is configured to spatially track at least the gun/torch or stick electrode. Alternatively, the non-imaging information may be generated by the system 100 itself by using at least one camera of the system 100 to spatially track the welding gun/torch or stick electrode, for example. In such an embodiment, the system 100 includes a tracking module to perform the spatial tracking functions.

In accordance with an alternative embodiment of the present invention, the system includes one or more three-dimensional (3D) view cameras, allowing a user to see the arc welding process scene in a 3D manner. The optical display assembly is configured to allow 3D viewing of the welding process scene by the user.

In accordance with an enhanced embodiment of the present invention, non-imaging information may be generated, gathered, and displayed on the display 180. For example, various guide information or help attributes may be overlaid onto the displayed real-time video to aid the user during the welding process. Such non-imaging information may include, for example, gun/torch angle or stick electrode angle, stick out distance from the workpiece, travel speed of the gun/torch or stick electrode, and gun/torch height or stick electrode height. The non-imaging information may be obtained from another system such as, for example, a virtual reality welding simulation system which is tethered into the system 100 and is configured to spatially track at least the gun/torch or stick electrode. Alternatively, the non-imaging information may be generated by the system 100 itself by using at least one camera of the system 100 to spatially track the welding gun/torch or stick electrode, for example. In such an embodiment, the system 100 includes a tracking module to perform the spatial tracking functions.

Other non-imaging information may include recommendations (e.g., "speed up", "slow down", "adjust angle", etc.). In fact, in accordance with an embodiment of the present invention, information obtained from the dual-spectrum video may be used to determine the recommendations. For example, if the thermal characteristics of the weld puddle indicate that the temperature of the weld puddle is too low, the system may display a recommendation to the user to slow down the travel speed of the torch to allow more thermal energy into the weld puddle. Other recommendations are possible as well, based on well-known good welding technique and the relationships between resultant weld characteristics and welding technique.

In summary, an embodiment of the present invention comprises a dual-spectrum digital imaging arc welding system providing enhanced discrimination between arc welding characteristics. The system includes a welding headgear configured to be worn on a head of a user to shield at least the eyes of the user from spectral radiation emitted by an arc welding process. A visible-spectrum (VS) digital camera is physically integrated with the welding headgear and configured to provide raw VS real-time digital video image frames representative of the arc welding process within a field-of-view of the VS digital camera. An infrared-spectrum (IRS) digital camera is physically integrated with the welding headgear and configured to provide raw IRS real-time digital video image frames representative of the arc welding process within a field-of-view of the IRS digital camera. An optical display assembly is physically integrated with the welding headgear to present real-time digital video images to the user while the user is wearing the welding headgear. A vision engine operatively interfaces with the VS digital camera, the IRS digital camera, and the optical display assembly. The vision engine is configured to produce at least dual-spectrum (DS) real-time digital video image frames from the raw VS and raw IRS real-time digital video image frames and display the DS real-time video image frames to the user via the optical display assembly.

The vision engine may be physically integrated with the welding headgear or may be physically separate from the welding headgear. For example, the system may include a welding power source, wherein the vision engine is physically integrated into and/or operatively interfaces with the welding power source. The system may include a welding wire feeder, wherein the vision engine, instead, is physically integrated into and/or operatively interfaces with the welding wire feeder.

The system may also include a user interface operatively interfacing to at least one of the vision engine and the optical display assembly. The user interface may be configured to allow a user to manually select an imaging mode from a plurality of selectable and pre-defined imaging mode, or may be configured to allow a user to manually change an imaging parameter preset to one of a plurality of selectable and pre-defined imaging parameter presets.

In accordance with an embodiment of the present invention, the vision engine includes a first image processor configured to perform image processing on the raw VS real-time digital video image frames to generate processed VS real-time digital video image frames representative of enhanced VS attributes of the welding process. The vision engine also includes a second image processor configured to perform image processing on the raw IRS real-time digital video image frames to generate processed IRS real-time digital video image frames representative of enhanced IRS attributes of the welding process. The vision engine further includes a third image processor configured to perform image processing on the processed VS real-time digital video image frames and the processed IRS real-time digital video image frames to generate the dual-spectrum (DS) real-time digital video image frames representative of combined VS and IRS attributes of the welding process. The vision system may also include a video frame aligning apparatus configured to spatially align temporally correlated pairs of digital video image frames of the processed VS real-time digital video image frames and the processed IRS real-time digital video image frames before providing the processed real-time digital video image frames to the third image processor.

Another embodiment of the present invention comprises a dual-spectrum digital imaging arc welding system providing enhanced discrimination between arc welding characteristics. The system includes means for shielding at least the eyes of a user from spectral radiation emitted by an arc welding process. The system further includes means for generating raw visual-spectrum (VS) real-time digital video image frames representative of visual-spectrum emissions of the arc welding process, wherein the means for generating raw visual-spectrum (VS) real-time digital video image frames is physically integrated with the means for shielding, and means for generating raw infrared-spectrum (IRS) real-time digital video image frames representative of infrared-spectrum emissions of the arc welding process, wherein the means for generating raw infrared-spectrum (IRS) real-time digital video image frames is physically integrated with the means for shielding. The system further includes means for displaying real-time digital video image frames, wherein the means for displaying is physically integrated with the means for shielding. The system also includes means for producing at least dual-spectrum (DS) real-time digital video image frames from the raw VS and raw IRS real-time digital video image frames and providing at least the DS real-time digital video image frames to the means for displaying.

The means for producing at least dual-spectrum (DS) real-time digital video image frames may be physically integrated with the means for shielding, or may be physically separate from the means for shielding. For example, the system may also include a welding power source wherein the means for producing at least dual-spectrum (DS) real-time digital video image frames is physically integrated into and/or operatively interfaces with the welding power source. The system may further include a welding wire feeder wherein the means for producing at least dual-spectrum (DS) real-time digital video image frames, instead, is physically integrated into and/or operatively interfaces with the welding wire feeder.

The system may further include means for allowing a user to manually select an imaging mode from a plurality of selectable and pre-defined imaging modes and/or means for allowing a user to manually change an imaging parameter preset to one of a plurality of selectable and pre-defined imaging parameter presets.

The means for producing at least dual-spectrum (DS) real-time digital video image frames may include means for performing image processing on the raw VS real-time digital video image frames to generate processed VS real-time digital video image frames representative of enhanced VS attributes of the welding process. The means for producing may also include means for performing image processing on the raw IRS real-time digital video image frames to generate processed IRS real-time digital video image frames representative of enhanced IRS attributes of the welding process. The means for producing may further include means for performing image processing on the processed VS real-time digital video image frames and the processed IRS real-time digital video image frames to generate DS real-time digital video image frames representative of combined VS and IRS attributes of the welding process. The means for producing at least dual-spectrum (DS) real-time digital video image frames may further include means for spatially aligning temporally correlated pairs of digital video image frames of the processed VS real-time digital video image frames and the processed IRS real-time digital video image frames before providing the processed VS and IRS real-time digital video image frames to the means for performing image processing on the processed VS and IRS real-time digital video image frames.

A further embodiment of the present invention comprises a vision engine. The vision engine includes several image processors. A first image processor is configured to perform image processing on raw VS real-time digital video image frames to generate processed VS real-time digital video image frames representative of enhanced VS attributes of a welding process. A second image processor is configured to perform image processing on raw IRS real-time digital video image frames to generate processed IRS real-time digital video image frames representative of enhanced IRS attributes of the welding process. A third image processor is configured to perform image processing on temporally correlated pairs of the processed VS real-time digital video image frames and the processed IRS real-time digital video image frames to generate DS real-time digital video image frames representative of combined VS and IRS attributes of the welding process. The vision engine may further include a video frame aligning apparatus configured to spatially align the temporally correlated pairs of digital video image frames of the processed VS real-time digital video image frames and the processed IRS real-time digital video image frames before providing the processed VS and IRS real-time digital video image frames to the third image processor.

Another embodiment of the present invention comprises a method of generating enhanced dual-spectrum real-time digital video of a welding process. The method includes capturing raw visual-spectrum (VS) and raw infrared-spectrum (IRS) real-time digital video image frames of a welding process via a shielding apparatus worn by a welder performing the welding process to shield the welder from harmful radiation emitted by the welding process. The raw VS real-time digital video image frames are pre-processed to generate pre-processed VS real-time digital video image frames by maintaining and enhancing desired visual-spectrum attributes of the welding process and by removing unwanted visual-spectrum attributes of the welding process. The raw IRS real-time digital video image frames are pre-processed to generate pre-processed IRS real-time digital video image frames by maintaining and enhancing desired infrared-spectrum attributes of the welding process and by removing unwanted infrared-spectrum attributes of the welding process. Temporally correlated pairs of image frames of the pre-processed VS and IRS real-time digital video image frames are then processed to generate dual-spectrum (DS) real-time digital video image frames. One of the DS real-time digital video image frames, the pre-processed VS real-time digital video image frames, and the pre-processed IRS real-time digital video image frames is displayed to the welder via the shielding apparatus as the welder wears the shielding apparatus during the welding process in response to selection by the welder, for example.

In accordance with an embodiment of the present invention, each pixel of each frame of the DS real-time digital video image frames corresponds to one of visual-spectrum information, infrared-spectrum information, and a blending of visual-spectrum information and infrared-spectrum information. The method may further include spatially aligning, on a pixel-by-pixel basis, the temporally correlated pairs of image frames before processing the temporally correlated pairs of image frames to generate the DS real-time digital video image frames.

Particular image processing functions performed as part of the pre-processing of the raw visual-spectrum (VS) real-time digital video image frames may be selectable from a plurality of image processing options. Similarly, particular image processing functions performed as part of the pre-processing of the raw infrared-spectrum (IRS) real-time digital video image frames may be selectable from a plurality of image processing options. Also, particular image processing functions performed as part of the processing to generate the dual-spectrum (DS) real-time digital video image frames may be selectable from a plurality of image processing options. Furthermore, particular image processing functions performed as part of the pre-processing steps and the processing step of the method may be dependent on selecting a welding process form a plurality of welding processes.

Another embodiment of the present invention comprises a dual-spectrum digital imaging arc welding system providing enhanced discrimination between arc welding characteristics to a user. The system includes a welding headgear configured to be worn on a head of a user and to shield at least the eyes of the user from spectral radiation emitted by an arc welding process. The system also includes a dual-spectrum (DS) digital camera physically integrated with the welding headgear and configured to provide raw visible-spectrum (VS) real-time digital video image frames and raw infrared-spectrum (IRS) real-time digital video image frames. The system further includes an optical display assembly physically integrated with the welding headgear and configured to present real-time digital video images to the user while the user is wearing the welding headgear. The system also includes a vision engine operatively interfacing with the DS digital camera and the optical display assembly, wherein the vision engine is configured to produce at least dual-spectrum (DS) real-time digital video image frames from the raw VS and raw IRS real-time digital video image frames.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A welding system comprising:
    a welding headgear configured to be worn on a head of a user; at least one digital camera mounted on the welding headgear and configured to collect visible-spectrum digital video and infrared-spectrum digital video;
    a vision engine operatively interfacing with the at least one digital camera configured to combine the visible-spectrum digital video and infrared-spectrum digital video to produce a dual-spectrum digital video;
    a user interface for manual selection of any one of the visible-spectrum digital video, the infrared-spectrum digital video, and the dual-spectrum digital video wherein the user interface is mounted on the welding headgear;
    an optical display of the welding headgear configured to present a corresponding selected one of the visible-spectrum digital video, the infrared-spectrum digital video, and the dual-spectrum digital video to the user, based on said manual selection from the user interface, a removable lens cover that is removable from the welding headgear, wherein the removable lens cover comprises a visible spectrum lens and an infrared-spectrum lens, and wherein the at least one digital camera is located on digital camera and the infrared-spectrum digital camera are exposed when the removable lens cover is removed from the welding headgear.

2. The welding system of claim 1, wherein the vision engine combines the visible-spectrum digital video and the infrared-spectrum digital video by at least spatially aligning the visible-spectrum digital video and the infrared-spectrum digital video.

3. The welding system of claim 1, wherein the vision engine combines the visible-spectrum digital video and the infrared-spectrum digital video by at least temporally aligning the visible-spectrum digital video and the infrared-spectrum digital video.

4. The welding system of claim 1, wherein the at least one digital camera includes a visible-spectrum digital camera and an infrared-spectrum digital camera.

5. The welding system of claim 1, wherein the at least one digital camera collects images in one of grayscale or color.

6. The welding system of claim 1, wherein the vision engine is further configured to process non-imaging information, and wherein the optical display of the welding headgear is further configured to present the non-imaging information to the user.

7. The welding system of claim 6, wherein the non-imaging information is overlaid onto the dual-spectrum digital video.

8. The welding system of claim 6, wherein the non-imaging information includes at least one of gun/torch angle, electrode angle, stick out distance, distance from work piece, travel speed, gun/torch height, and electrode height.

9. The welding system of claim 6, wherein the non-imaging information includes recommendations for the user.

10. A welding method, comprising:
    capturing visible-spectrum video image frames of a welding process using a shielding apparatus worn by a welder performing the welding process;
    capturing infrared-spectrum video image frames of the welding process using the shielding apparatus worn by the welder performing the welding process;
    processing the visible-spectrum video image frames and the infrared-spectrum video image frames to produce at least blended visible-spectrum and infrared-spectrum information;
    receiving a user selection of any one of visible-spectrum video, infrared-spectrum video, and the blended visible-spectrum and infrared-spectrum information; and
    displaying, based on said user selection; a corresponding one of the visible-spectrum video, the infrared-spectrum video, and the blended visible-spectrum and infrared-spectrum information using the shielding apparatus worn by the welder performing the welding process
    wherein the shielding apparatus comprises a visible-spectrum camera, an infrared-spectrum camera, and a removable lens cover that is removable from the shielding apparatus, wherein the removable lens cover comprises a visible-spectrum lens and an infrared-spectrum lens, the method further comprising the step of simultaneously exposing the visible-spectrum camera and the infrared-spectrum camera by removing the removable lens cover from the shielding apparatus.

11. The welding method of claim 10, further comprising spatially aligning the visible-spectrum video image frames and infrared-spectrum video image frames during processing.

12. The welding method of claim 10, further comprising temporally aligning the visible-spectrum video image frames and infrared-spectrum video image frames during processing.

13. The welding method of claim 10, further comprising:
gathering non-imaging information related to the welding process; and displaying the non-imaging information using the shielding apparatus worn by the welder performing the welding process.

14. The welding method of claim 13, wherein the non-imaging information includes at least one of gun/torch angle, electrode angle, stick out distance, distance from workpiece, travel speed, gun/torch height, and electrode height.

15. A welding system, comprising:
means for capturing visible-spectrum video image frames of a welding process using a shielding apparatus worn by a welder performing the welding process;
means for capturing infrared-spectrum video image frames of the welding process using the shielding apparatus worn by the welder performing the welding process;
means for processing the visible-spectrum video image frames and the infrared-spectrum video image frames to produce at least blended visible-spectrum and infrared-spectrum information;
means for receiving a user selection of any one of visible-spectrum video, infrared-spectrum video, and the blended visible-spectrum and infrared-spectrum information; and
means for displaying, based on said user selection, a corresponding one of the visible-spectrum video, the infrared-spectrum video, and the blended visible-spectrum and infrared-spectrum information using the shielding apparatus worn by the welder performing the welding process, wherein:
the means for capturing visible-spectrum video image frames comprises a visible-spectrum camera,
the means for capturing infrared-spectrum video image frames comprises an infrared-spectrum camera,
the shielding apparatus comprises a removable lens cover that is removable from the shielding apparatus, and the removable lens cover comprises a visible-spectrum lens and an infrared-spectrum lens, and
the visible-spectrum camera and the infrared-spectrum camera are located on the shielding apparatus behind the removable lens cover such that the visible-spectrum camera and the infrared-spectrum camera are simultaneously exposed when the removable lens cover is removed from the shielding apparatus.

16. The welding system of claim 15, further comprising:
means for gathering non-imaging information related to the welding process; and
means for displaying the non-imaging information using the shielding apparatus worn by the welder performing the welding process.

17. The welding system of claim 16, wherein the non-imaging information includes at least one of gun/torch angle, electrode angle, stick out distance, distance from workpiece, travel speed, gun/torch height, and electrode height.

* * * * *